(No Model.)

S. F. BERRY.
LOCK SNAP HOOK.

No. 462,465. Patented Nov. 3, 1891.

WITNESSES
Carroll J. Webster
G. G. Southard

INVENTOR
Samuel F. Berry
By William Webster
his Atty.

UNITED STATES PATENT OFFICE.

SAMUEL F. BERRY, OF TOLEDO, OHIO, ASSIGNOR OF ONE-HALF TO WILLIAM H. ATWILL, OF SAME PLACE.

LOCK-SNAP HOOK.

SPECIFICATION forming part of Letters Patent No. 462,465, dated November 3, 1891.

Application filed April 9, 1891. Serial No. 388,220. (No model.)

*To all whom it may concern:*

Be it known that I, SAMUEL F. BERRY, of Toledo, county of Lucas, and State of Ohio, have invented certain new and useful Improvements in Lock-Snap Hooks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a lock-snap hook, and has particular reference to that class of hooks used upon the tugs, straps, &c., of harness.

The object of the invention is to provide a hook of inexpensive construction and that shall be provided with an automatic locking mechanism, whereby a ring or other object secured within the hook will be locked from accidental disconnection therefrom, and also with means for conveniently releasing the locking mechanism when it is desired to remove the ring or other object from the snap.

The invention consists in the parts and combination of parts hereinafter described, and pointed out in the claims.

Figure 1:
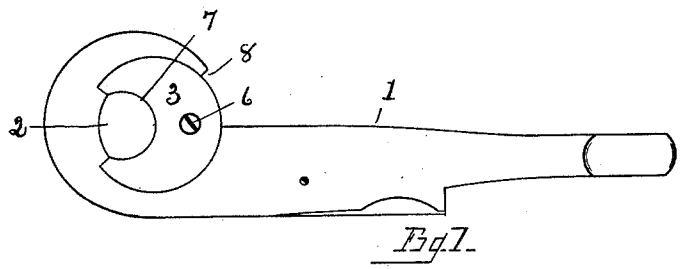
Figure 2:
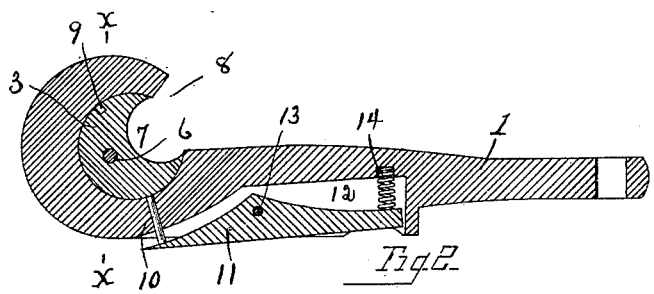
Figure 3:
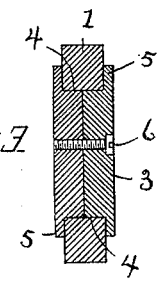
Figure 4:
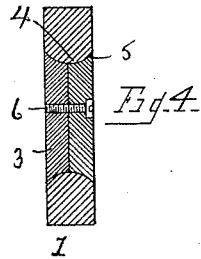

In the drawings, Figure 1 is a side elevation of one form of hook provided with my improved lock-snap. Fig. 2 is a longitudinal vertical sectional view of the same. Fig. 3 is a transverse section on lines *x x*, Fig. 2. Fig. 4 is a like view showing the hook concave upon the inner face, with the revoluble disk or snap convexed to fit the same.

1 designates the hook, in the present instance shown as an ordinary harness-hook, although I wish it to be understood that the construction, form, and size of the hook may be varied to suit the different classes of work to which it may be put.

2 designates a circular recess formed by the bend of the hook and into which is revolubly secured a snap or disk 3, said disk 3 being held within the recess 2, with the periphery in close contact with the inner side of the chamber and held in place by means of the projecting edges of the disk contacting with the sides of the hook. The disk 3 is formed of two like sections, as shown in Fig. 3, having a circular portion 4 of a diameter to fit within the recess of the hook, and side flanges 5 to bear against the side of the hook, or, as shown in Fig. 4, the recess is concaved in form in cross-section and the periphery of the disk convex to fit the same, the two sections of disk being secured together by screws or pins 6.

It will be seen by the foregoing description that the disk is revolubly secured within the hook without the necessity of journals of any character, thereby giving to the bearing the full strength of the hook or disk and rendering this part of construction very simple and inexpensive.

Disk 3 is chambered at 7 to form a semicircular recess of a shape to allow of inserting a ring of the desired size therein and allow the disk to revolve, carrying the ring below opening 8 of the hook, thereby securing the ring within the hook, as is clearly illustrated by the positions of disk 3 in Figs. 1 and 2.

In order to lock the snap or disk 3, I form a perforation 9 in the disk and provide a locking-pin 10, adapted to enter the perforation when the disk is turned in the position shown in Fig. 1. Pin 10 is secured in a lever 11, secured in a chamber 12, formed in the body of the hook, the lever being secured therein by means of a fulcrum-pin 13 and urged outward at the end opposite to the pin by means of a spring 14, whereby the tendency of pin 10 is to bear upon the periphery of the disk until the perforation is brought into coincidence with the pin when it enters the perforation and locks the disk from revolution, thereby positively securing the ring or other object within the hook.

In operation, the snap or disk being in the position shown in Fig. 2, the ring or other object is passed through the opening in the hook and is seated in the semicircular recess 7, when by a pull upon the ring the snap is caused to revolve until in the position shown in Fig. 1, when pin 10 enters the perforation 9 and locks the snap in place. In order to release the ring from the hook, the end of the lever opposite to the pin is depressed, withdrawing the pin, when the snap or disk is free to revolve to the position shown in Fig. 2, thereby releasing the ring.

What I claim is—

1. A lock-snap hook formed with a circular recess, and circular chambered disk or snap revolubly secured therein by flanges on the disk, in combination with the locking mechanism on the hook to coact with the snap or disk.

2. In a lock-snap hook, a hook formed with a circular recess, a chamber upon the rear side, a spring-actuated lever fulcrumed within the chamber and carrying a locking-pin, and a chambered snap or disk revolubly secured in the recess of the hook formed with a perforation adapted to receive the locking-pin.

In testimony that I claim the foregoing as my own I hereby affix my signature in presence of two witnesses.

SAMUEL F. BERRY.

Witnesses:
 WILLIAM WEBSTER,
 CARROLL J. WEBSTER.